H. G. McILVRIED.
BAR PILER.
APPLICATION FILED DEC. 29, 1913.
1,129,214.
Patented Feb. 23, 1915.
3 SHEETS—SHEET 3.
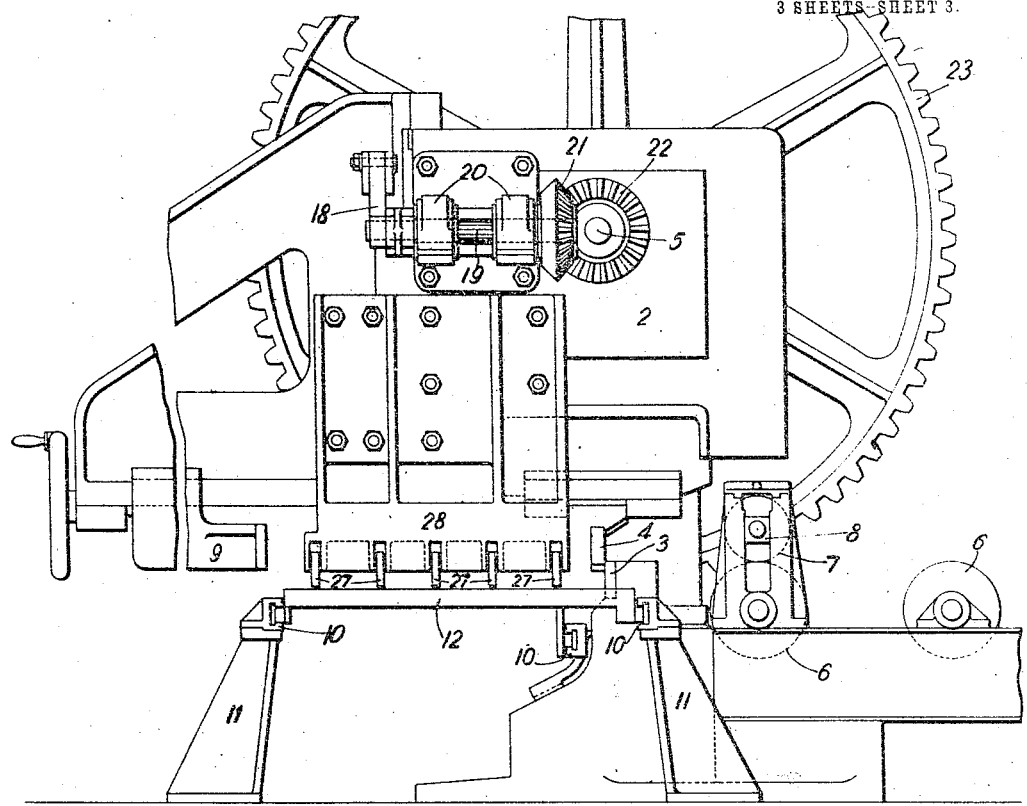
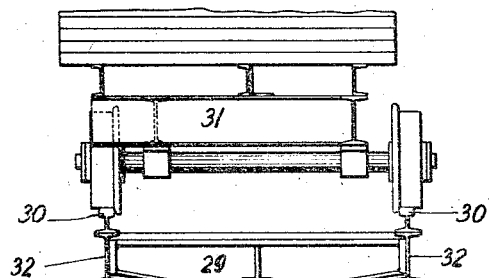
FIG. 3
WITNESSES
INVENTOR

UNITED STATES PATENT OFFICE.

HOWARD G. McILVRIED, OF PITTSBURGH, PENNSYLVANIA, ASSIGNOR TO AMERICAN SHEET AND TIN PLATE COMPANY, OF PITTSBURGH, PENNSYLVANIA, A CORPORATION OF NEW JERSEY.

BAR-PILER.

1,129,214.          Specification of Letters Patent.      Patented Feb. 23, 1915.

Application filed December 29, 1913. Serial No. 809,250.

*To all whom it may concern:*

Be it known that I, HOWARD G. McILVRIED, a citizen of the United States, residing at Pittsburgh, in the county of Allegheny and State of Pennsylvania, have invented a new and useful Bar-Piler, of which the following is a specification.

My invention relates to apparatus used in handling metal bars and similar materials, and more particularly to apparatus for use in conjunction with a shear for handling sheared sheet and tin bars in the removal of the bars after the shearing operation from in front of the shear.

One object of my invention is to provide an improved bar piling apparatus having novel means for automatically transferring the sheared bars and similar materials from in front of a shear into position to be removed to a place of use.

Another object of my invention is to provide improved means for actuating the bar piling mechanism in timed relation with the cutting operations of the shear to thereby automatically remove the cut bars from in front of the shear and out of the path of materials to be sheared at the same rate of speed at which the materials are cut to length by the shear.

A further object of the invention is to provide a bar piler having novel means for mechanically stacking the sheared bars or other materials in a pile or series of piles as removed from in front of the shear.

A still further object of the invention is to provide a bar handling mechanism having improved means co-acting with the shear and bar piling mechanism for receiving the sheared bars as delivered and formed into piles by the piling mechanism.

Still further objects of the invention will become apparent as the apparatus is more fully disclosed hereinafter.

Figure 1:
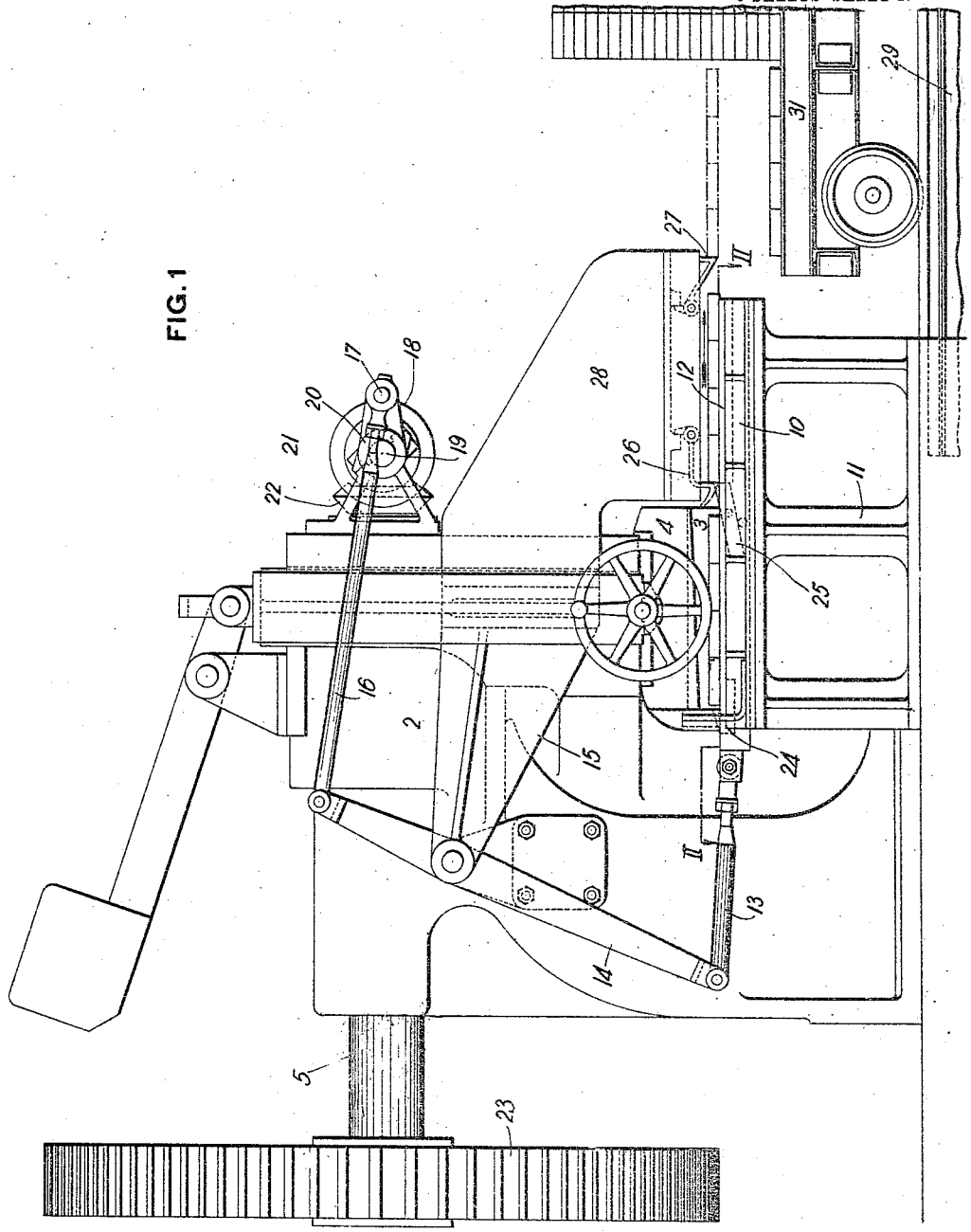
Figure 2:
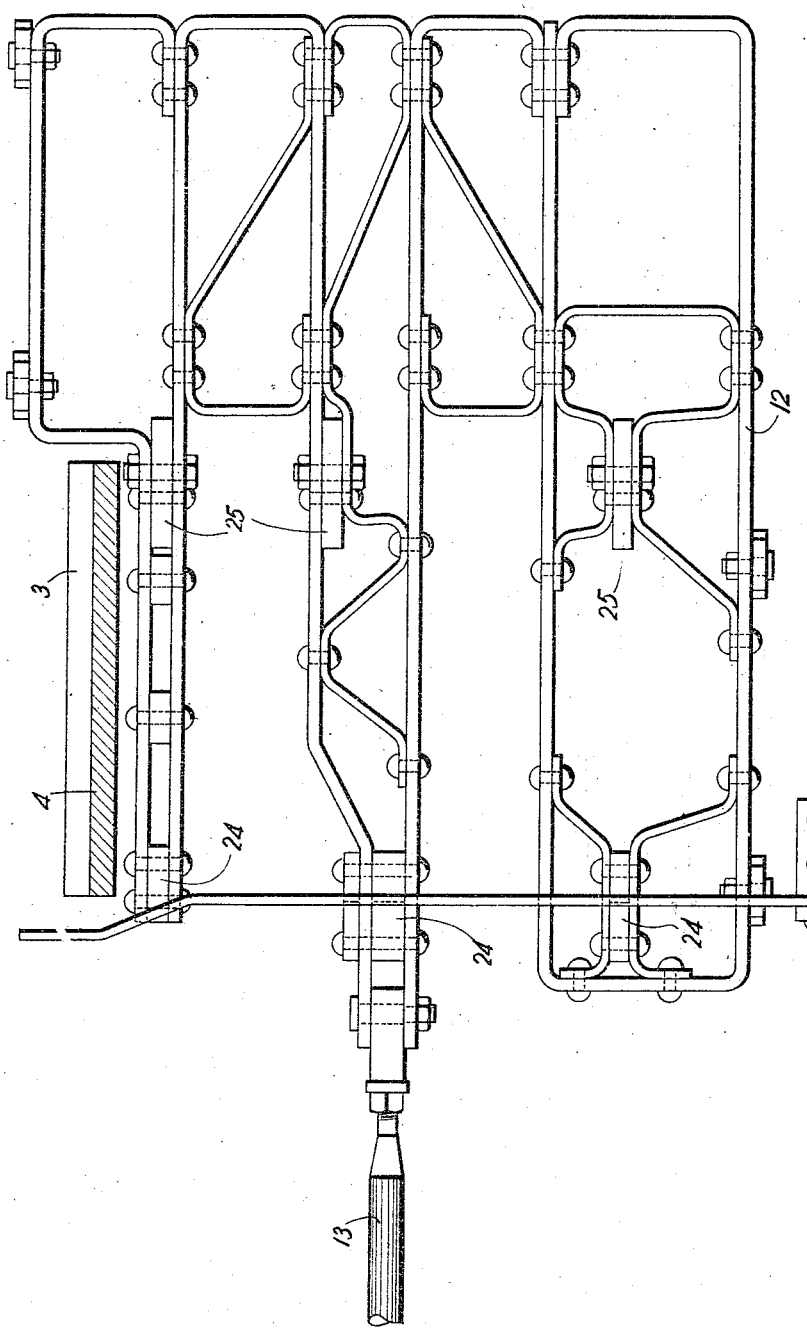

In the drawings forming part of this specification, Figure 1 is a longitudinal side elevation showing a bar piling mechanism constructed and arranged and applied for use with a tin or sheet bar shear in accordance with my invention. Fig. 2 is a sectional plan on an enlarged scale, showing part of the bar handling mechanism of Fig. 1, the section being taken on the line II—II of Fig. 1. Fig. 3 is an end elevation of the bar piling mechanism illustrated in Figs. 1 and 2.

In the accompanying drawings, the numeral 2 designates the frame or housing of a shear having a stationary shear knife 3 and having a vertically reciprocating shear knife 4 which is actuated by means of a suitable motor, not shown, through the medium of the cam shaft 5. The shear and shear knife operating mechanism not in themselves forming part of this invention are not further described.

On the rear side of the shear is a roller feed table having a series of positively driven feed rollers 6, 6, of the usual known construction. Arranged to co-act with the end roller 6 of the feed table adjacent to the shear is a pinch roller 7 which is mounted in bearings 8, 8, so as to be vertically movable, this pinch roller being employed to provide a convenient means for feeding short lengths of materials to be cut between the shear knives and into engagement with the shear stop or gage 9 of the shear. The gage 9 is adjustably mounted in bar engaging position in front of or on the discharging side of the shear 2.

Mounted in the recessed guides or slides 10, 10, which are secured upon standards 11, 11, on the front side of the shear, is a lengthwise reciprocating bar receiving support or table 12. The table as shown is positioned in front of the shear so as to reciprocate lengthwise at right angles to the lengthwise line of feed of the materials cut by the shear or stated in another way, the table 12 extends and is movable lengthwise transversely to the length of the feed table by which the materials are fed lengthwise between the shear knives to be sheared.

Pivotally secured by one end to one end of the reciprocating table 12 is a lengthwise adjustable connecting rod 13 which is pivotally secured at its other end to the lower end of a rocker arm or lever 14. The rocker arm 14, at an intermediate point in its length, is pivoted to a bracket 15 on the shear housing or frame 2, and the upper end of the lever 14 is pivotally connected by a connecting rod 16 to the crank pin 17 on the crank 18. The crank 18 is mounted on and rotated by the countershaft 19 which is mounted in the bracket bearings 20, 20 at the top of the shear 2. One end of the shaft 19 is provided with a bevel gear 21 meshing with and driven by the bevel gear 22 which is keyed or otherwise fastened on one end of the shear cam shaft 5 to be rotated thereby. The cam shaft 5 is connected through the spur gear 23 with a shear driving motor, not shown.

The rear end of the reciprocating table 12 is provided with a set of four dogs 24 having end portions arranged to project above the upper surface of the table, these dogs being located so as to be positioned at one side of the gap or throat of the shear when the reciprocating table is in bar receiving position, and preferably being rigidly secured to the table. At an intermediate point in the length of the reciprocating table is a second set of dogs 25 pivotally mounted thereon, the rear or lowermost end of these tilting dogs being of such length or weight as will always maintain the upper ends thereof in lifted position by gravity. A stop is provided to limit the downward swinging movement of the rear ends of the dogs. Pivotally mounted on the frame 2 of the shear is another set of tilting dogs 26, which have rearwardly and upwardly inclined bottom edge portions adapted to engage with and be lifted or tilted by the bars or other materials supported on the reciprocating table in moving such materials thereon from in front of the shear knives. Also mounted on the frame 2 of the shear is another set of dogs 27 having inclined portions arranged to engage with sheared materials on the reciprocating table and be lifted in the same manner as the dogs 26. The dogs 26 and 27 are pivoted to the lower surface of the bracket 28 which is conveniently fastened on one side of the shear housing or frame 2, and the series of sets of tilting dogs are arranged to co-act in the operation of my improved apparatus, as will be described hereinafter.

Positioned at one side of the shear and at the end of the reciprocating table is a hoist or lifting mechanism having track rails 30, 30, which aline with the rails forming the car track leading away from the shear, and mounted upon this lifting mechanism is a truck or car 31 on which the cut materials are deposited from the reciprocating table, and by means of which the piled materials are transported to a place of use or storage.

As illustrated in Figs. 1 and 3, the hoist mechanism for the car 31 comprises rail supports 32 tied together with a cross beam 29 which is secured on the end of the piston rod 33 for the vertical hydraulic cylinder 34 conveniently located in a pit beneath the track formed by the rails 30, 30. The opposite ends of the cylinder 34 are connected through a suitable operating valve with a source of fluid pressure. Mechanism other than that shown may be substituted therefor to raise and lower the car 31.

In the operation of my improved apparatus the parts being constructed as shown, the tin or sheet bars or other materials are delivered in multiple length pieces, lengthwise from the rolling mill or other place of supply upon or by the feed table having the feed rollers 6, 6, and pinch roller 7. The knives 3 and 4 of the shear, as shown, are of such width that a series of four bars of the usual width can be fed simultaneously between the shear knives into engagement with the shear stop or gage 9. The front ends of the series of multiple length materials to be sheared are first cropped and the materials are then moved lengthwise until the cropped ends thereof are in engagement with the shear gage 9. This gage, which is adjustable toward and away from the shear knives, is previously set the required distance from the shear knives to cut bars of the desired length. The shear knife 3 is then actuated, which cuts pieces of the desired length from the multiple length bars supported upon the roller feed table. The operation of the shear being continued, the upper shear knife 3 is retracted and simultaneously therewith the connected table operating mechanism formed by the connecting rods 13 and 16, swinging arm 14, shaft 19 and bevel gears 21 and 22, cause the reciprocating table 12 to move from left to right or in the direction of the arrow in Fig. 1, for the full length of the reciprocating movement of this table and then backwardly into its fully retracted position, or the position shown relatively to the shear in Fig. 1. In the meantime the multiple length materials on the feed rollers 6 have been again advanced until the forward end thereof is in engagement with the shear gage 9. The shear knives then again approach and sever the materials projecting between the shear knives from the materials resting on the feed table and during the time the shear knife 3 is being retracted and again advanced into cutting engagement with the materials between the shear knives, the reciprocating table 12 is caused to advance and be again retracted. In the backward movement of the reciprocating table 12 the sheared materials resting thereon are first engaged by the set of tilting dogs 26 on the shear and backward movement of such materials is prevented. After the second cutting operation, when the second lot of cut bars are being moved from in front of the shear, the tilting dogs 25, positioned on the reciprocating table at an intermediate point in the length thereof, engage with and cause the first cut lot of bars to move forwardly with or upon the reciprocating table 12. The fixed dogs 24 at the rear end of the table engage with the second cut lot of bars thereon and move these bars into position immediately in front of the tilting dogs 26 on the shear. When the shear is retracted for the second time, the first cut lot of materials are engaged by the tilting dogs 27 on the outer end of the bracket 28 on the shear, and backward movement of these materials is prevented so that the reciprocating table 12 is withdrawn from beneath these bars and the bars are permitted to drop vertically. As the table is withdrawn from beneath the bars they drop upon the car 31, which is positioned on the track 30 at one side of the shear 2. In receiving the cut materials upon the car 31, the piston rod 33 of the hydraulic cylinder 34 is extended to lift the car 31 until its bottom is slightly below the level of the bottom surface of the table 12, so as to lessen the distance the plates must drop from the table 12 to the car and in this way facilitate the piling or stacking operations. The car 31 is lowered gradually as the height of the pile of plates increases to maintain the top of the pile in proximity to the table 12. The above described operations are then repeated with successive lots of cut bars and the cut bars are caused to drop from the reciprocating table 12 to the last discharged lot of bars resting upon the wheeled car 31 and in this way a pile or series of piles, depending upon the number of bars cut at each shearing operation, are formed on the cars without manual labor and solely by mechanical means, in the continued operation of the shear.

The advantages of my invention will be apparent to those skilled in the art.

The apparatus is simple and is easily kept in repair.

Modifications in the construction and arrangement of the parts may be made without departing from my invention. The reciprocating table may be arranged to reciprocate lengthwise parallel with the lengthwise line of feed of bars between the shear knives; the length of the table may be increased or lessened, as desired, and the number of sets of tilting dogs employed on the shear and on the table may be changed. The car for receiving the piles of cut materials may be dispensed with and the piles of bars formed on the ground at the discharge end of the carrier, and other changes may be made within the scope of the appended claims.

I claim:—

1. A bar piler comprising a reciprocating receiving table, means for reciprocating the table to move a bar supported thereon from the bar receiving position of the table, and means for preventing backward movement of bars supported thereon with the backward movement of the reciprocating table to withdraw the table from beneath said bars and thereby stack successive bars in a pile.

2. A bar piler comprising a reciprocating receiving table, means for reciprocating the table to move a plurality of bars supported thereon from the bar receiving position of the table, and means for preventing backward movement of the bars supported thereon with the backward movement of the table to withdraw the table from beneath said bars and thereby stack successive lots of bars in adjacent piles.

3. A bar piler comprising a reciprocating bar receiving table, means for reciprocating the table to move a bar supported thereon from the bar receiving position of the table, means for preventing backward movement of a bar supported thereon with the backward movement of the table to withdraw the table from beneath said bar and thereby stack successive bars in a pile, and a wheeled truck below the level of the table to receive the piled bars as discharged from the table.

4. A bar piler comprising a reciprocating bar receiving table, means for reciprocating the table to move a bar supported thereon from the bar receiving position of the table, means for preventing backward movement of a bar supported thereon with the backward movement of the table to remove the table from beneath said bar and thereby stack successive bars in a pile, a wheeled truck below the level of the table to receive the piled bars as discharged from the table, and means for moving the truck vertically during the piling operations to maintain the truck in ar receiving position.

5. A bar piler comprising a reciprocating bar receiving table, means for reciprocating the table to move a bar supported thereon from the bar receiving position of the table, and a pivoted dog engaging with and preventing backward movement of the bar supported on the table with the backward movement of the table to remove the table from beneath the bar and stack successive bars in a pile.

6. A bar piler comprising a reciprocating bar receiving table, means for reciprocating the table to move bars supported thereon from the bar receiving position of the table, pivoted dogs for preventing backward movement of a bar supported on the table with the backward movement of the table to thereby permit removal of the table from beneath said bar and cause successive bars to be stacked in a pile at the discharge end of said table.

7. In a bar piler the combination of a shear having a shear stop and means for advancing bars between the shear knives into engagement with said stop, of a reciprocating bar receiving table on the discharge side of said shear, means connecting the shear and table to reciprocate the shear in unison with the shearing operations, and means on the shear engaging with sheared bars on the table to prevent backward movement thereof with the backward movement of the reciprocating table and thereby permit removal of the table from beneath the bars and cause successive bars to be stacked in a pile.

In testimony whereof, I have hereunto set my hand.

HOWARD G. McILVRIED.

Witnesses:
F. HARPER,
CARL L. SCHUMANN.